(12) United States Patent
Toyama et al.

(10) Patent No.: US 6,502,082 B1
(45) Date of Patent: Dec. 31, 2002

(54) MODALITY FUSION FOR OBJECT TRACKING WITH TRAINING SYSTEM AND METHOD

(76) Inventors: Kentaro Toyama, 9210 162nd Pl. NE, Redmond, WA (US) 98052; Eric J. Horvitz, 330 Waverly Way, Kirkland, WA (US) 98033

( * ) Notice: Subject to any disclaimer, the term of this patent is extended or adjusted under 35 U.S.C. 154(b) by 0 days.

(21) Appl. No.: 09/416,189

(22) Filed: Oct. 12, 1999

Related U.S. Application Data

(63) Continuation-in-part of application No. 09/323,724, filed on Jun. 1, 1999.

(51) Int. Cl.[7] ............................................. G06F 15/18
(52) U.S. Cl. .............................. 706/16; 706/15; 706/20
(58) Field of Search ............................ 342/64; 89/1.11; 706/23, 24, 16, 15, 20; 367/131

(56) References Cited

U.S. PATENT DOCUMENTS

| | | | | |
|---|---|---|---|---|
| 5,020,411 A | * | 6/1991 | Rowan | 89/1.11 |
| 5,341,142 A | * | 8/1994 | Reis et al. | 342/64 |
| 5,532,511 A | * | 7/1996 | DeAngelis et al. | 706/24 |
| 5,704,018 A | * | 12/1997 | Heckerman et al. | 706/12 |
| 6,161,130 A | * | 12/2000 | Horvitz et al. | 709/206 |
| 6,169,981 B1 | * | 1/2001 | Werbos | 706/23 |
| 6,192,360 B1 | * | 2/2001 | Dumais et al. | 707/6 |

FOREIGN PATENT DOCUMENTS

| | | | |
|---|---|---|---|
| EP | 0 933 726 A2 | 8/1999 | |
| JP | 0 933 726 A2 * | 4/1999 | G06T/7/20 |

OTHER PUBLICATIONS

Luettin, J. et al.; "Speechreading using probalistic models", Computer Vision and Image Understanding, U.S. Academic Press, vol. 65, No. 2, Feb. 1, 1997, pps. 163–178.*

Yang, J. et al.; "Visual tracjing for multimodal human computer interaction", Chi Conference Proceeding, Human Factors in Computing Systems, U.S. New York, NY: ACM, Apr. 18, 1998, pps. 140–147.*

Heckerman, D., Geiger, D., and Chickering, D., "Learning Bayesian Networks: The Combination of Knowledge and Statistical Data", Machine learning, (1995), pps. 1–53.*

Luettin J et al.: "Speechreading using probabilistic models", Computer Vision and Image Understanding, U.S., Academic Press, vol. 65, No. 2, Feb. 1, 1997, pp. 163–178, XP000686182, ISSN: 1077–3142.

(List continued on next page.)

*Primary Examiner*—Thomas Black
*Assistant Examiner*—Michael B. Holmes
(74) *Attorney, Agent, or Firm*—Lyon & Harr; Mark Watson; Richard Lyon

(57) ABSTRACT

The present invention is embodied in a system and method for training a statistical model, such as a Bayesian network, to effectively capture probabilistic dependencies between the true state of an object being tracked and evidence from various tracking modalities to achieve robust digital vision tracking. The model can be trained and structured offline using data collected from sensors, that may be either vision or non-vision-based, in conjunction with position estimates from the sensing modalities. Both the individual reports about targets provided by visual processing modalities and inferences about the context-sensitive accuracies of the reports are considered. Dependencies among variables considered in the model can be restructured with Bayesian learning methods that revise the dependencies considered in the model. In use, the learned models for fusing multiple modalities of visual processing provide real-time position estimates by making inferences from reports from the modalities and by inferences about the context-specific reliabilities of one or more modalities.

33 Claims, 14 Drawing Sheets

OTHER PUBLICATIONS

Yang, J et al.: "Visual tracking for multimodal human computer interaction", Chi Conference Proceedings. Human Factors in Computing Systems, U.S., New York, NY: ACM, Apr. 18, 1998, pp. 140–147, XP000780786, ISBN: 0–89791–975–0.

Co–pending U.S. Patent Application No. 09/175,182,"A System and Method for Automatically Detecting Pixel Clusters Within An Image," filed Oct. 28, 1998.

Heckerman, D., Geiger, D., and Chickering, D. Learning Bayesian networks: The Combination of knowledge and statistical data. Machine Learning, 20:197–243. 1995.

* cited by examiner

MODALITY FUSION FOR OBJECT TRACKING WITH TRAINING SYSTEM AND METHOD

CROSS REFERENCE TO RELATED APPLICATIONS

This application is a continuation in part of U.S. patent application Ser. No. 09/323,724, filed on Jun. 1, 1999 by Horvitz et al. and entitled "A SYSTEM AND METHOD FOR TRACKING OBJECTS BY FUSING RESULTS OF MULTIPLE SENSING MODALITIES".

BACKGROUND OF THE INVENTION

1. Field of the Invention

The present invention relates to a system and method for visually tracking objects by fusing results of multiple sensing modalities of a model, and in particular to a model such as a Bayesian network, that can be trained offline from data collected from a sensor, and wherein dependencies considered in the model can be restructured with Bayesian learning methods that identify new dependencies.

2. Related Art

Applications of real-time vision-based object detection and tracking are becoming increasingly important for providing new classes of services to users based on an assessment of the presence, position, and trajectory of objects. Research on computer-based motion analysis of digital video scenes centers on the goal of detecting and tracking objects of interest, typically via the analysis of the content of a sequence of images. Plural objects define each image and are typically nebulous collections of pixels, which satisfy some property. Each object can occupy a region or regions within each image and can change their relative locations throughout subsequent images and the video scene. These objects are considered moving objects, which form motion within a video scene.

Facial objects of a human head, such as mouth, eyes, nose, etc., can be types of moving objects within a video scene. It is very desirable to automatically track movement of these facial objects because successful digital motion analysis of facial movement has numerous applications in real world environments. For example, one application includes facial expression analysis for automatically converting facial expressions into computer readable input for performing computer operations and for making decisions based on human emotions derived from the facial expressions. Another application is for digital speech recognition and "lip reading" for automatically recognizing human speech without requiring human vocal input or for receiving the speech as computer instructions. Another application is the visual identification of the nature of the ongoing activity of one or more individuals so as to provide context-sensitive informational display, assistance, and communications.

However, current real-time tracking systems, which depend on various visual processing modalities, such as color, motion, and edge information, are often confused by waving hands or changing illumination. Also, specific visual processing modalities may work well in certain situations but fail dramatically in others, depending on the nature of the scene being processed. Current visual modalities, used singularly, are not consistent enough to detect all heads nor discriminating enough to detect heads robustly. Color, for example, changes with shifts in illumination. Yet, "skin color" is not restricted to skin.

As such, in the past, a variety of techniques have been investigated to unify the results of sets of sensors. Recent techniques have attempted to perform real-time head tracking by combining multiple visual cues. One previous technique used variations of a probabilistic data association filter to combine color and edge data for tracking a variety of objects. Another previous technique used priors from color data to bias estimation based on edge data within their framework. Another technique uses edge and color data. Head position estimates are made by comparing match scores based on image gradients and color histograms. The estimate from the more reliable modality is returned. Another technique heuristically integrates color data, range data, and frontal face detection for tracking.

Methods employing dynamic models such as Bayesian networks have the ability to fuse the results of multiple modalities of visual analysis. The structure of such models can be based on key patterns of dependency including subassemblies of the overall dependency model that relate the inferred reliabilities of each modality to the true state of the world. The parameters of these models can be assessed manually through a reliance on expert knowledge about the probabilistic relationships.

Nevertheless, these systems and techniques do not reliably and effectively combine the results of multiple modes of analysis, nor do they make use of ideal parameters that are derived from a consideration of data that can be collected experimentally. Therefore, what is needed is a system and method for training a dynamic model, such as a Bayesian network, to effectively capture probabilistic dependencies between the true state of the object being tracked and evidence from the tracking modalities. Such a system can be used to enhance a model constructed by an expert, or to eliminate the need for a person to assess the ideal parameters of the Bayesian model.

SUMMARY OF THE INVENTION

To overcome the limitations in the related art described above, and to overcome other limitations that will become apparent upon reading and understanding the present application, the present invention is embodied in a system and method for training a dynamic model, such as a Bayesian network, to effectively capture probabilistic dependencies between the true state of an object being tracked and evidence from various tracking modalities. The system and method of the present invention fuses results of multiple sensing modalities to automatically infer the structure of a dynamic model, such as a Bayesian network, to achieve robust digital, vision tracking. The model can be trained and structured offline using data collected from a sensor that may be either vision, or non-vision, based in conjunction with position estimates from the sensing modalities. Further, models based on handcrafted structures and probability assessments can also be enhanced by training the models with experimentally derived real-world data.

Automated methods for identifying variable dependencies within the model are employed to discover new structures for the probabilistic dependency models that are more ideal in that they better explain the data. Dependencies considered in the model can be restructured with Bayesian learning methods that identify new dependencies in the model. Further, the model can automatically adapt its position estimates by detecting changes in indicators of reliability of one or more modalities.

In general, context-sensitive accuracies are inferred for fusing the results of multiple vision processing modalities for tracking tasks in order to achieve robust vision tracking, such as head tracking. This is accomplished by fusing together reports from several distinct vision processing procedures. Beyond the reports, evidence with relevance to the accuracy of the reports of each modality is reported by the vision processing modalities.

Evidence about the operating context of the distinct modalities is considered and the accuracy of different modalities is inferred from sets of evidence with relevance to identifying the operating regime in which a modality is operating. In other words, observations of evidence about features in the data being analyzed by the modalities, such as a vision scene, are considered in inferring the reliability of a methods report. The reliabilities are used in the Bayesian integration of multiple reports. Offline training of the model increases the accuracy of the inferences of object position that are derived from the model.

Specifically, dynamic Bayesian modality-accuracy models are built either manually, or automatically by a system and method in accordance with the present invention. Reports from multiple vision processing modalities of the models are fused together with appropriate weighting to infer an objects position. Bayesian network learning algorithms are used to learn the dependencies among variables to infer the structure of the models as well as to restructure and increase the accuracy of the models through training. Structuring and training of the models may be accomplished by providing sets of training cases that incorporate ground truth data obtained by using a sensor to accurately provide object position information, estimates of position produced by each modality, reliability indicators for each modality, and the "ground-truth reliability." The ground-truth reliability is a measure of the reliability of position information inferred from each modality with respect to the absolute difference between the position data provided by the sensor and the position estimates inferred by each modality.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The present invention is embodied in a system and method for performing automated motion analysis and visual tracking, such as tracking human head and facial movements by dynamically providing object position estimates, preferably using Bayesian modality fusion techniques. Position estimates are provided by fusing multiple vision tracking methods within a probabilistic framework. Namely, the Bayesian modality fusion system and method models probabilistic dependencies using a Bayesian network and integrates distinct modalities such as motion, color, shape, and edge data. The system and method of the present invention uses a dynamic model, such as a Bayesian network, which can be trained offline from data collected from a sensor that may be either vision, or non-vision, based. Dependencies considered in the model can be restructured with Bayesian learning methods that identify new dependencies in the model. Further, the model can automatically adapt its position estimates by detecting changes in indicators of reliability of one or more modalities.

Exemplary Operating Environment

Figure 1:
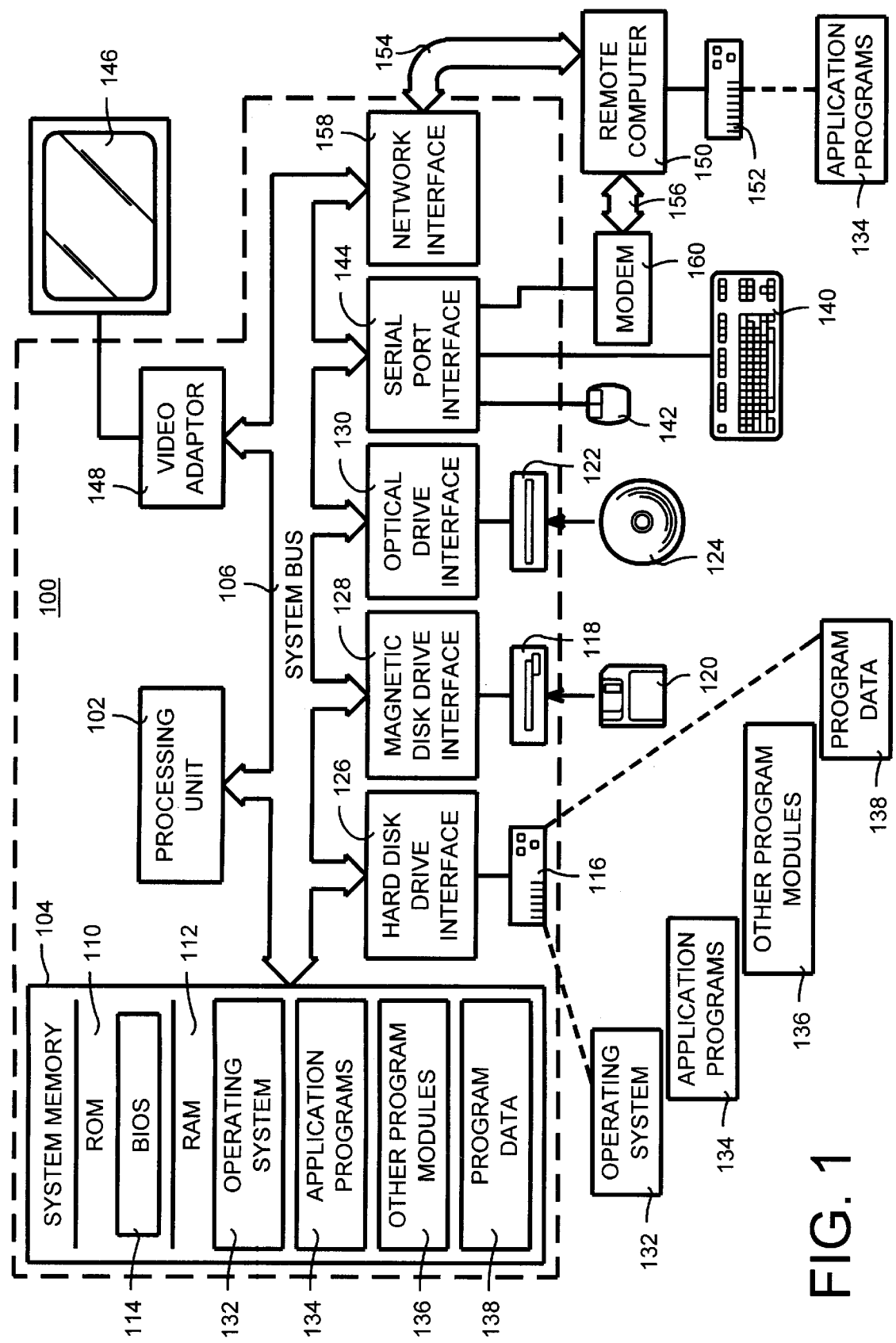
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 124, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically. includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

System Overview

Figure 2:
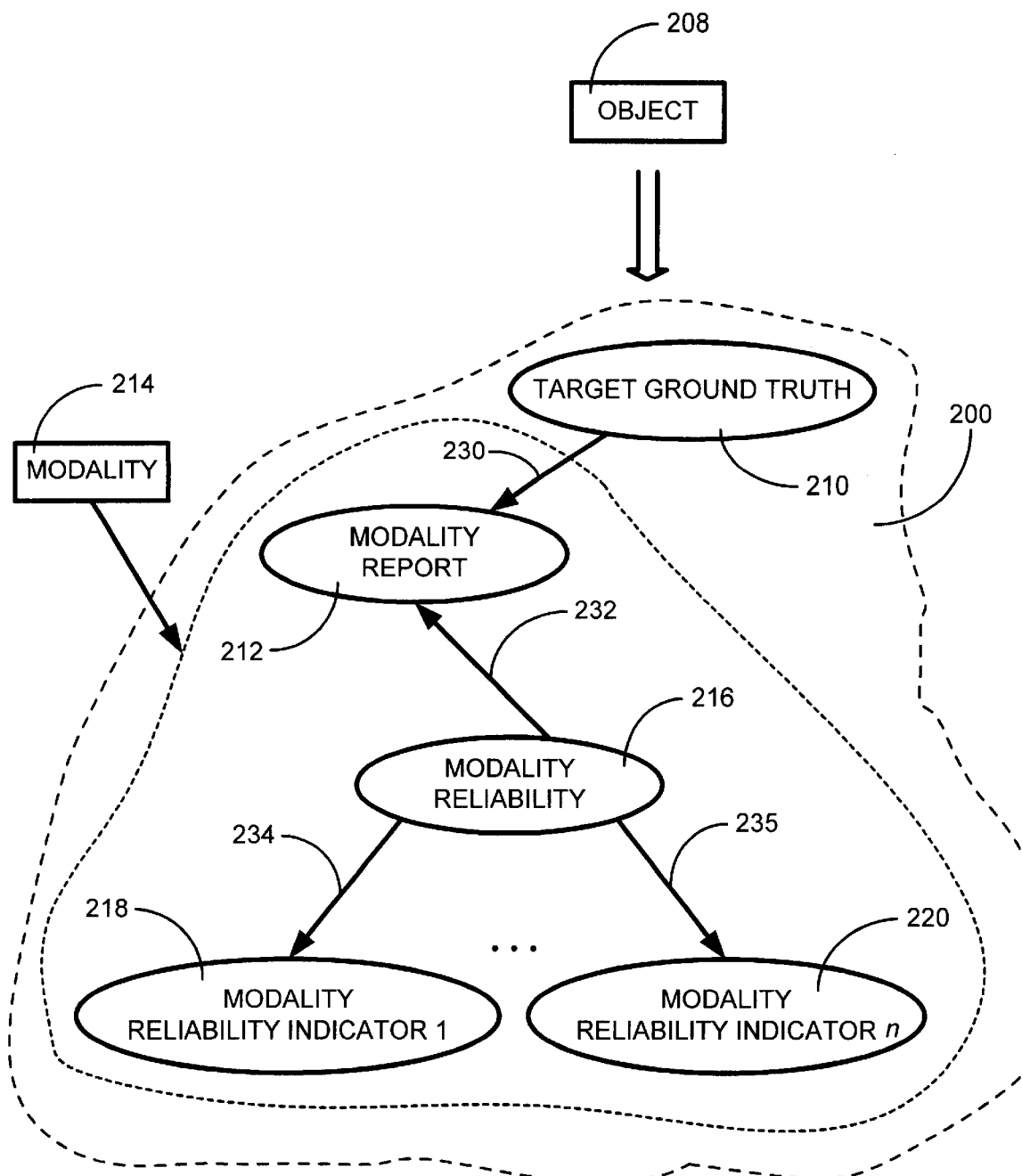
FIG. 2 is a block diagram illustrating a system for inferring data about a visual target conditioned on report information from a single modality in accordance with the present invention.

FIG. 2 is a general block diagram illustrating an overview of the present invention. The system 200 robustly tracks a target object 208 by inferring target data 210, such as the state of the object 208, including position or object coordinate information, orientation, expression, etc., conditioned on report information 212 produced by at least one sensor modality 214 tracking the target 208. The system 200 can be used as a vision-based tracking system for tracking objects of a digitized video scene, such as an input sequence of digital images. The input sequence can be from a live camera or from a sequence of images stored on a recording medium, such as a tape, disk, or any suitable source medium. The target data 210 can be true state information about the target object 208 of the image sequence. Different types of data present in the image sequence, such as color, edge, shape, and motion, can be considered different sensing modalities.

In this case, the system 200 is preferably a Bayesian network for performing Bayesian vision modality fusion for multiple sensing modalities. The Bayesian network captures the probabilistic dependencies between the true state of the object 208 being tracked and evidence obtained from multiple tracking sensing modalities 214. A Bayesian network is a directed acyclic graph that represents a joint probability distribution for a set of random variables. As shown in FIG. 2, the Bayesian network 200 includes nodes 210, 212, 216, 218 and 220, which represent variables of interest or random variables. Arcs or line connectors 230, 232 and 234, 235 represent probabilistic dependencies among pairs of variables. The Bayesian network facilitates making associative and causal assertions about probabilistic influences among the variables.

The present invention constructs, learns, and performs inference with Bayesian models. This includes the use of exact and approximate algorithms for Bayesian-network inference procedures, methods that allow for the learning of conditional probabilities represented in a Bayesian model, the induction of network structure from data, and networks for reasoning over time. In addition, conceptual links between Bayesian networks and probabilistic time-series analysis tools such as hidden Markov models (HMMs) and Kalman filters can be implemented in the present invention. HMMs and Kalman filters can be represented by Bayesian networks with repetitive structure capturing prototypical patterns of independence among classes of variables.

Components and Operation of a Single Modality

For each sensor modality 214, nodes 212, 218 and 220 are variables that are instantiated by the sensor modality 214 and nodes 210 and 216 represent inferred values. In particular, node 210 is a target ground truth node that represents an unknown state of the target object and the goal of system 200 inference.

From a Bayesian perspective, the ground-truth state influences or causes an output from the sensor modality 214 (it should be noted that the use of term "causes" comprises both deterministic and stochastic components). This influence is indicated with arc 230 from the ground truth node 210 to the modality report node 212. The modality report node 212 is also influenced by its reliability, or its ability to accurately estimate ground-truth state, as indicated with an arc 232 from the modality reliability node 216 to the modality report node 212.

Although reliabilities themselves typically are not directly observed, both reliabilities and estimates of reliabilities vary with the structure of the scene being analyzed. To build a coherent framework for fusing reports from multiple modalities, reliability can be considered as an explicit or implicit variable. From this, probabilistic submodels are built to dynamically diagnose reliability as a function of easily ascertainable static or dynamic features detected by the automated analysis of the image. As shown in FIG. 2, such evidence is represented by n modality reliability indicator nodes 218, 220, which are in turn influenced by the modality reliability node 216, as indicated by the arcs 234, 235.

During operation for a single modality, the Bayesian model is instantiated with the modality report 212 and reliability indicators 218, 220 associated with the sensor modality 214. It should be noted that the order or frequency that the modality contributes its report is flexible. The reliability of the sensor modality 214 is computed and the modality report 212 is used to provide a probability distribution over the ground-truth state 210 of the target object 208.

Fusion of Multiple Modalities

Figure 3:
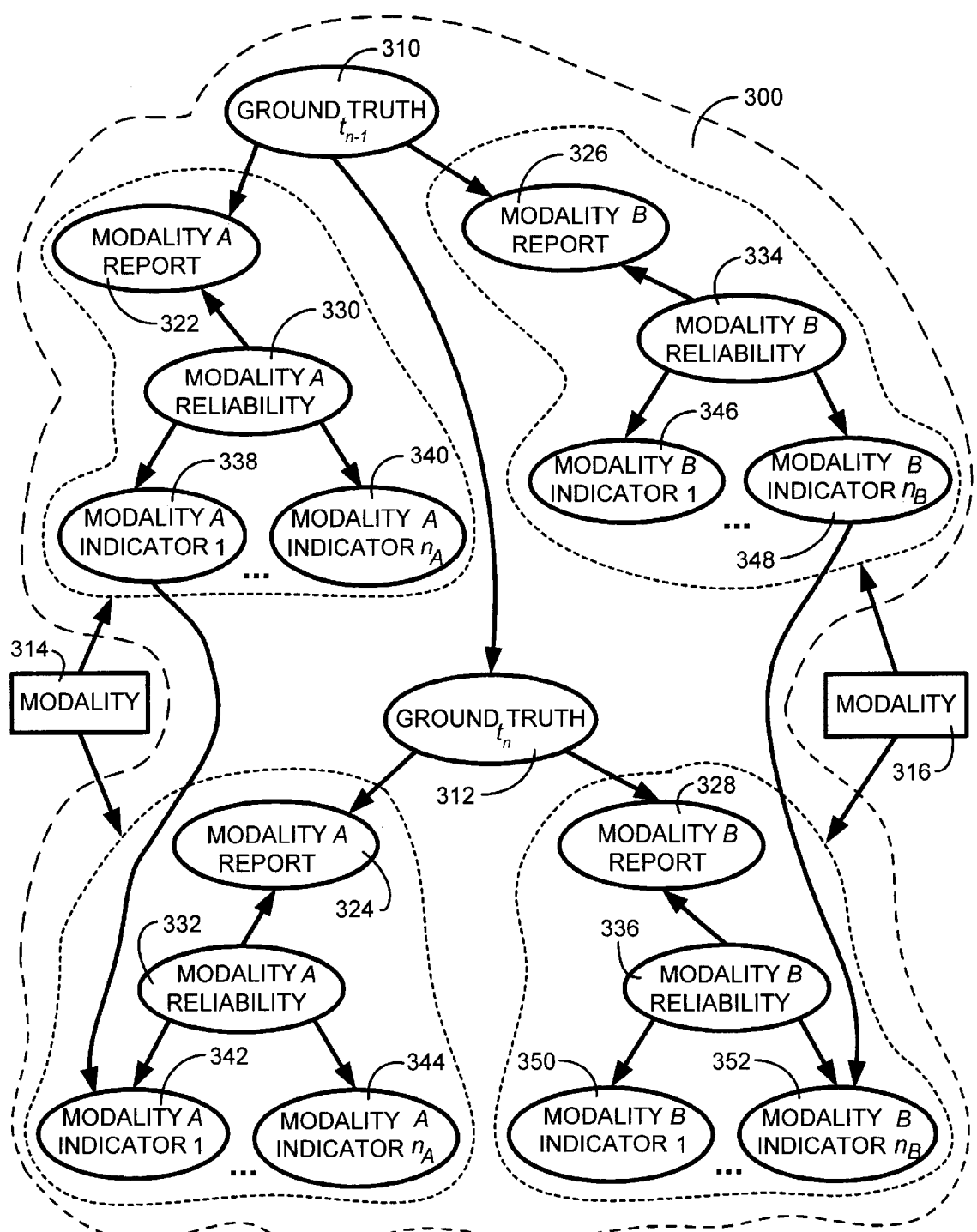
FIG. 3 is a detailed block diagram illustrating a temporal or dynamic Bayesian network, a Bayesian network model that includes an explicit representation of potential probabilistic dependencies among variables at different points in time,for integrating multiple modalities in accordance with the present invention.

In the description above for FIG. 2, a model for inferring the probability distribution over the true state of a target was considered from a report by a single modality. FIG. 3 is a detailed block diagram illustrating a temporal or dynamic network model 300 capturing temporal dependencies among variables at adjacent points in time for integrating multiple modalities for tracking at least one object, such as an object similar to object 208 of FIG. 2, in accordance with the present invention. The structure of the network model illustrated in FIG. 3 may be specified manually (i.e. created by an expert), or, as discussed in detail below, the structure may be inferred automatically.

The network 300 includes multiple ground truth states 310, 312 each having associated multiple modalities 314, 316, respectively. Each modality 314, 316 produces a modality report represented by nodes 322, 324, 326, 328 respectively, influenced by corresponding modality reliability nodes 330, 332, 334, 336. Evidence represented by respective 1 through n modality reliability indicator nodes 338–340, 342–344, 346–348, 350–352 is in turn caused or influenced by respective modality reliability nodes 330, 332, 334, 336.

The temporal network 300 of FIG. 3 extends the single modality embodiment of FIG. 2 in two ways. First, the network 300 of FIG. 3 includes subsequent ground truth states, $t_n$, and multiple modalities 314, 316, namely sensor modalities A and B for the subsequent ground truth states tn 312. Each modality 314, 316 produces subsequent modality reports 324, 328 (reports A and B) influenced by respective reliability submodels 332, 336 (submodels A and B) for the subsequent ground truth states $t_n$ 312. It should be noted that although two modalities and respective reports and reliabilities (A and B) are shown in FIG. 3, m different modalities can be included in a similar manner.

The model is further extended to consider temporal dynamics, as well. In the simplest approach, the reliability indicator nodes 338 and 340, 342 and 344, 346 and 348, 350 and 352 can be defined as functions of the dynamics of image features. For example, for image sequences, rapid change in global intensity values over the image could be used as an indicator variable.

In a more explicit approach, the model 300 can be extended so that sets of variables are labeled as states at different times. Representations of Bayesian networks over time that include temporal dependencies among some subset of variables are referred to as dynamic Bayesian networks. In the model of FIG. 3, a previous true state directly influences a current true state and prior reliability indicators influence current indicators. For example, as shown in FIG. 3, previous ground truth $t_{n-}$(node 310) directly influences a current ground truth $t_n$ (node 312) and prior reliability indicators (nodes 338 and 348) influence current indicators (nodes 342 and 352). By modeling the integration of multiple modalities and considering the changing reliabilities of reports, a flexible filter is gained which weights previous estimates to different degrees based on estimates of their accuracy Structuring and Training of Model Parameters In accordance with the present invention, real-world data in combination with multiple vision modalities is preferably used in training and structuring of a Bayesian network as applied to object tracking, such as human head tracking. It should be noted that although the following description involves the use of a single position sensor and three modalities, any number or type of position sensors and modalities can be used.

In general, a training system in accordance with the present invention may be constructed by integrating a Polhemus Fastrak position-sensing device, or any other sufficiently accurate position sensing device, with the output from one or more vision modalities, such as, for example, a background subtraction modality, a color-based tracking modality, and/or a motion-based tracking modality. Specific details of each of these modalities are discussed below. The Polhemus device is preferably attached to the top of the head of a human subject. Consequently, the Polhemus device will accurately report the position of the center of the head in a horizontal plane.

During training, position data is preferably collected from the Polhemus device as the subject moves about an area, and into or out of the area. In addition, each of the vision modalities provides position estimates of the subject's head, along with reliability indicators for each modality. Because the data collected does not directly provide an indication of the ground-truth reliability of the position estimates, the information for this "hidden variable" is preferably provided by computing the absolute difference between the position estimates of each of the modalities and the actual ground-truth position of the Polhemus sensing device. Ground-truth reliability may be computed in a variety of other ways using any function, which maps large deviations of the modality report from the Polhemus sensing device with a correspondingly worse reliability value. This information is weighted with the reliability indicators for each of the modalities to produce a reliability measurement for each modality. This data, including Polhemus ground-truth positions, modality position estimates, modality reliability indicators, and modality reliability measurements, are the variables that make up the body of training data that is preferably used to train and structure the Bayesian network.

The Bayesian network is basically a series of conditional probability tables whose entries are estimated based on data. These probability tables are preferably populated by converting the complete set of training data into sets of probabilities representing the respective conditional contexts, or more simply, the model variables.

Bayesian network learning techniques are applied to the variables in order to "learn" the dependencies among variables. These learning algorithms have the ability to identify the best dependency model to use to infer position information from the evidence provided by the multiple vision modalities. Further, these algorithms have the ability to characterize the strengths of the different dependencies in order to provide information about the relative value of the various modalities. The result of the application of the learning techniques is a model structure that is most likely to provide accurate position information from fusing the results of multiple sensing modalities. This network is then available for use as described below in the working example.

Figure 4:
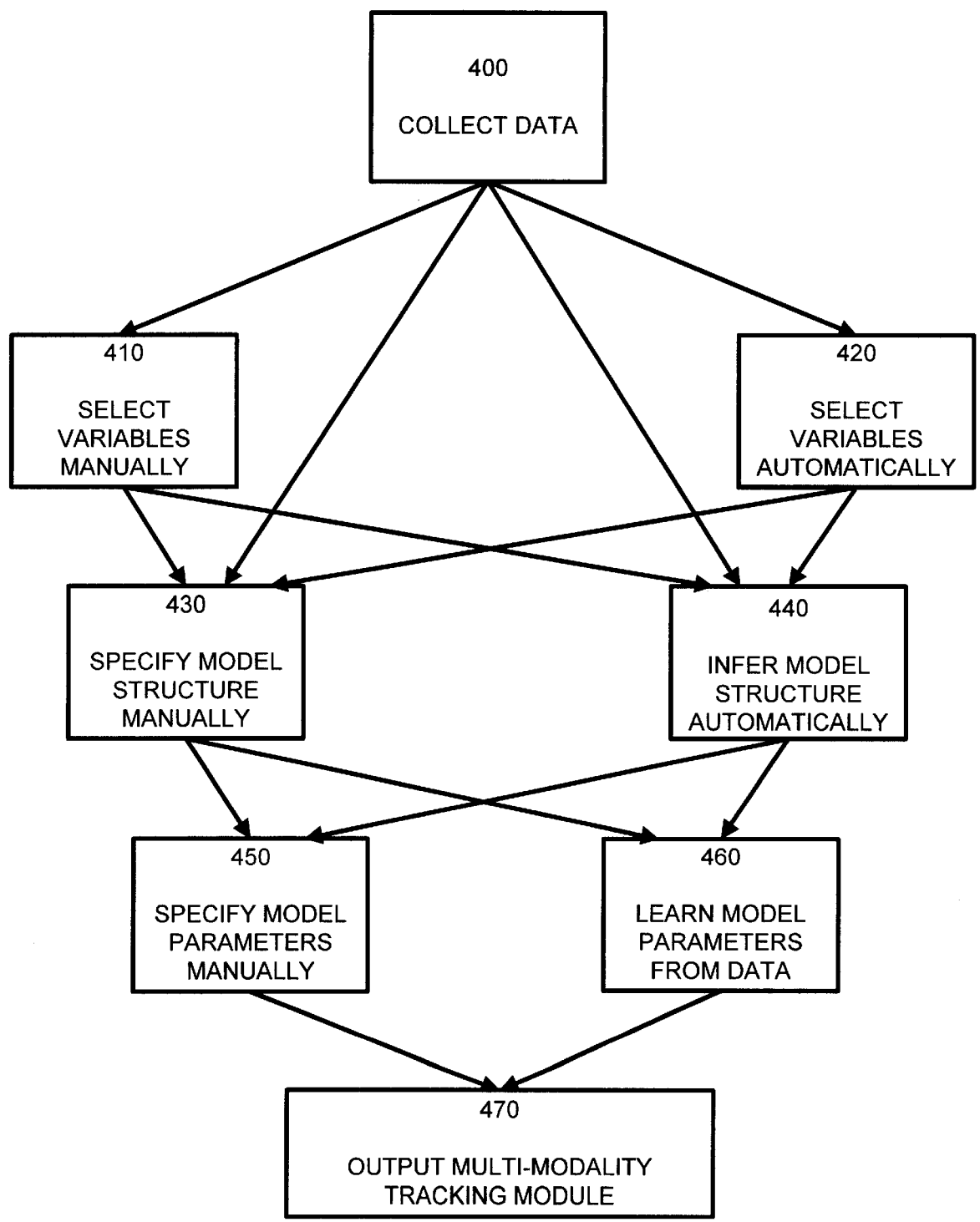
FIG. 4 is a block/flow diagram illustrating a general method and system for providing data to a Bayesian network model and structuring and/or training that model in accordance with the present invention.

Specifically, FIG. 4 is a block/flow diagram illustrating a general system and method for providing data to a Bayesian network model for structuring and/or training of that model in accordance with the present invention. Structuring and offline training of a Bayesian network model in accordance with the present invention can significantly improve the performance of such a model.

A data collection processor 400 collects position data from a vision based, or non-vision based sensor, such as a Polhemus Fastrak position-sensing device, and data from position estimates inferred from one or more vision modalities, such as, for example, a background subtraction modality, a color-based tracking modality, or a motion-based tracking modality. Specific details of each of these modalities are discussed below. The data is then output by the data collection processor 400 for selection of model variables. Variables may be selected either manually 410, or automatically by a variable selection processor 420. Given the availability of large numbers of variables, methods can be used to reduce the complexity of models and the associated data collection needs that may be associated with training large models. Procedures for making decisions about the most valuable set of variables to include in the model include using a general search in the context of a structural sensitivity analysis, and methods based on measures of mutual information for identifying the diagnostic power of individual variables under consideration. A more detailed discussion of mutual information can be found in co-pending U.S. patent application Ser. No. 09/102,946, filed on Jun. 23, 1998 and entitled "METHODS AND APPARATUS FOR CLASSIFYING TEXT AND FOR BUILDING A TEXT CLASSIFIER" by Dumais et al. and co-pending U.S. patent application Ser. No. 09/102,837 filed on Jun. 23 1998 and entitled "A TECHNIQUE WHICH UTILIZES A PROBABILISTIC CLASSIFIER TO DETECT "JUNK" E-MAIL" by Dumais et al., the subject matter of both which are incorporated herein by reference.

Following variable selection, either manually 410, or automatically 420, the variables are output for generation of an initial model structure. The initial model structure may be specified manually 430, or may be automatically inferred by a model structure inference processor 440. However, in one embodiment, the initial model structure may be created manually 430 or automatically inferred 440 based directly on the data output by the data collection processor 400.

In an alternate embodiment of the present invention the information in a manually derived model is preferably combined with methods for learning model structure, through a procedure of providing a measure of confidence in the manually derived model. Such measures of confidence can be reported in terms of an estimated sample size associated with the model. Further, subsets of the initial model structure may also be manually derived and combined with methods for learning model structure as described above. Further details on learning the structure of Bayesian models is provided in U.S. Pat. No. 5,704,018 filed May 9, 1994, entitled "GENERATING IMPROVED BELIEF NETWORKS", the subject matter which is incorporated herein by reference. Additional details are provided in "Heckerman, D., Geiger, D., and Chickering, D. (1995). *Learning Bayesian networks: The combination of knowledge and statistical data. Machine Learning, 20:197–243,*" the subject matter of which is incorporated herein by reference.

Once the model structure has been specified, 430 or 440, this structure, along with the position data and position estimates from the data collection processor 400 in conjunction with the model variables (410 and/or 420) is used to specify the model parameters manually 450, and/or to drive a model parameter processor 460 that "learns" the model parameters from the information provided.

Finally, a multi-modality tracking module processor 470 outputs a multi-modality tracking module based on the inputs of data, model variables, model structure, and model parameters. This multi-modality tracking module may be generally represented by the Bayesian network model of FIG. 3.

Figure 5:
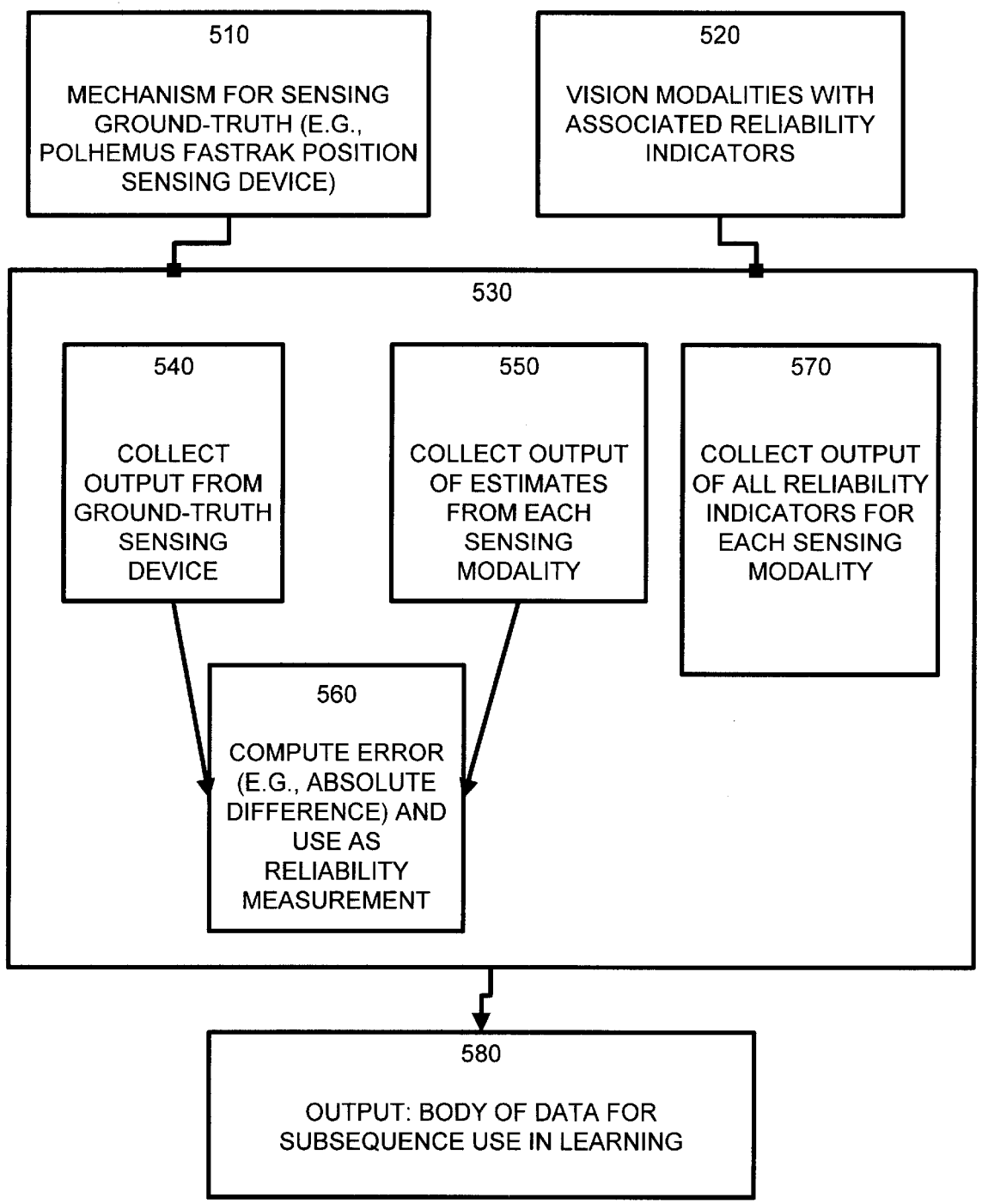
FIG. 5 is a block/flow diagram illustrating the system and method of collecting and outputting data of FIG. 4.

The preferred operation of the data collection processor 400 of FIG. 4 is detailed in FIG. 5. Position data from one or more position sensing devices 510, is combined with position estimates from one or more vision modalities having associated reliability indicators 520. This combined data is input to a data processor 530, where it is used to create a body of correlated data for later use in subsequence learning for the Bayesian network.

Specifically, the data processor 530 of FIG. 5 collects the position data output from a ground-truth sensing device 540, such as the Polhemus device, then compares that data with corresponding position estimates collected from each sensing modality 550 to compute the error 560 between specific ground-truth positions and the position estimates provided by each modality. The error is preferably a measure of the absolute difference between the ground-truth position and the position estimate. The computed error is then weighted with a reliability indicator collected for each modality 570 to produce a reliability measurement each modality. Further, because the various sensors and vision modalities may not necessarily have the same reporting interval or frequency, the data discussed above is collected and processed as it becomes available from the respective sensors or modalities. The output of the data processor 530 is a body of data for use in subsequence learning 580 of the Bayesian network.

Procedures with the ability to infer the structure and parameters of Bayesian models from data assign a measure of likelihood to alternate models and to select the model with the highest likelihood. It is difficult to compute the most likely model, given data, P(Model|data), directly. Most procedures that have been developed for inferring model structure attempt to approximate the related measure of the likelihood of seeing the data given a model, P(data|Model). The two measures are related by Bayes rule, via a normalization,factor. Several approximations to the P(data|Model) have been developed. One measure that has been found to be useful for inferring the structure of Bayesian networks is the Bayesian Information Criterion (BIC).

Figure 6:
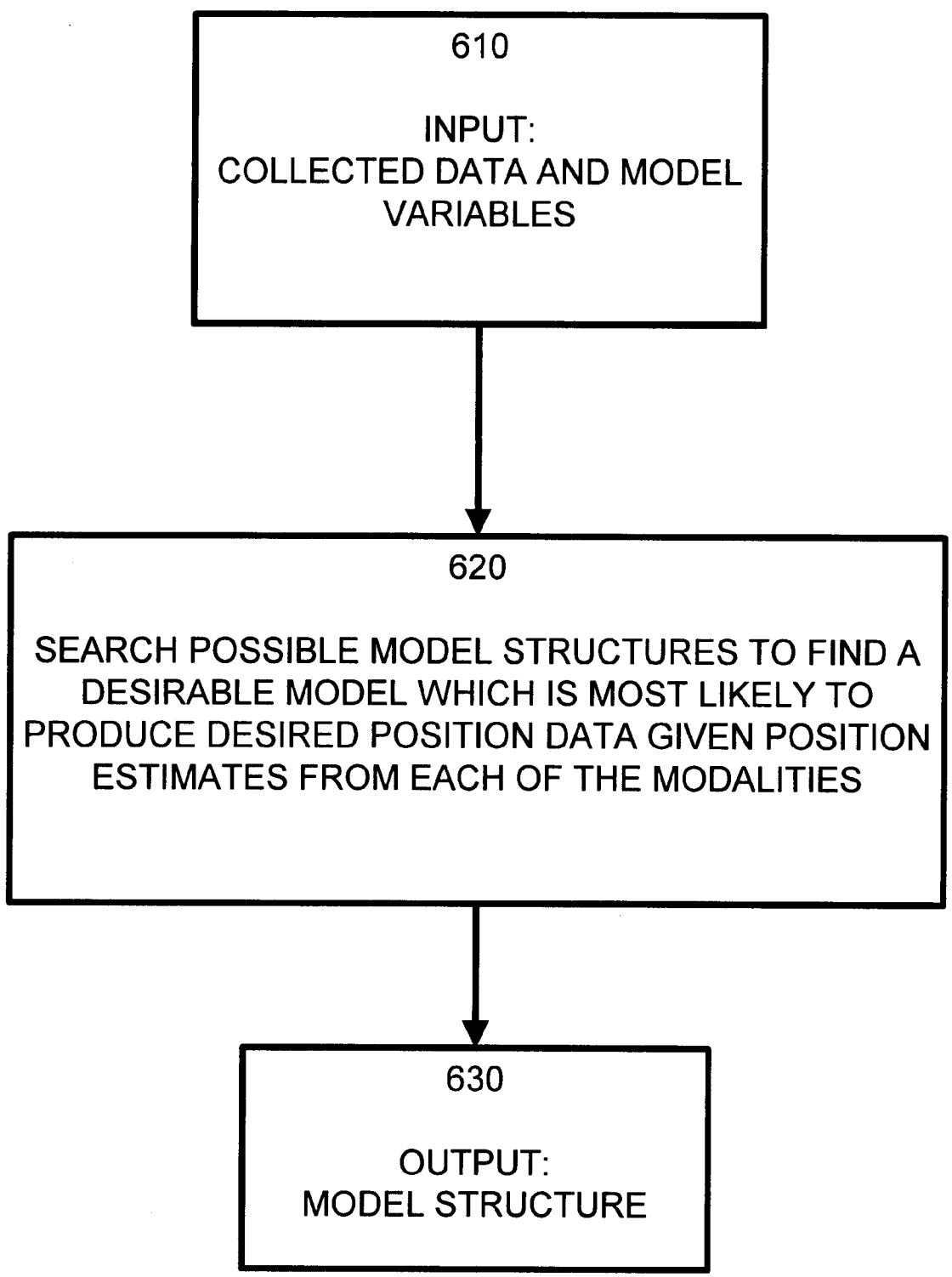
FIG. 6 is a block/flow diagram illustrating the system and method of automatically inferring model structure of FIG. 4.

In accordance with the present invention, inference of model structure by the model structure inference processor 440 of FIG. 4 is detailed by the block diagram of FIG. 6. Preferably, the model structure is inferred by inputting collected position data and position estimates with their associated reliability indicators 610 to an iterative model processor 620 which in turn outputs a model structure 630. The model processor 620 finds the probabilistic model that is most likely to produce the position data from the set of position estimates provided by the various modalities. Specifically, the model processor 620 preferably searches through all possible model structures, or a large set of possible model structures, depending on the size of the search space, given the model variables to find the dependency model that best explains the data.

The model structure produced by the learning procedure of the present invention preferably includes each of the input variables. These variables, as a result of their position in the model may have a parent and/or child relationship to other variables in the model. In other words, variables in the model that depend upon other variables will have a child/parent relationship with the variables from which they depend.

Alternatively, the model processor 620 may search through a subset of the possible models, such as models generated by a greedy, graph generation procedure. There are various reasons why searching through subsets of possible models may be advantageous, including, for example, reducing the search time to find the best model, or eliminating overly complex models which could increase processing time or load when implementing those models. In another alternative, the model processor 620 may search through all possible models, but may not necessarily output the model that is most probable to produce accurate position data. Again, reasons such as overly complex models may drive the decision to output a model having a somewhat lower probability of accurately providing position data from the position estimates of the various modalities. The decision may be one of desired accuracy versus computational cost.

Figure 7:
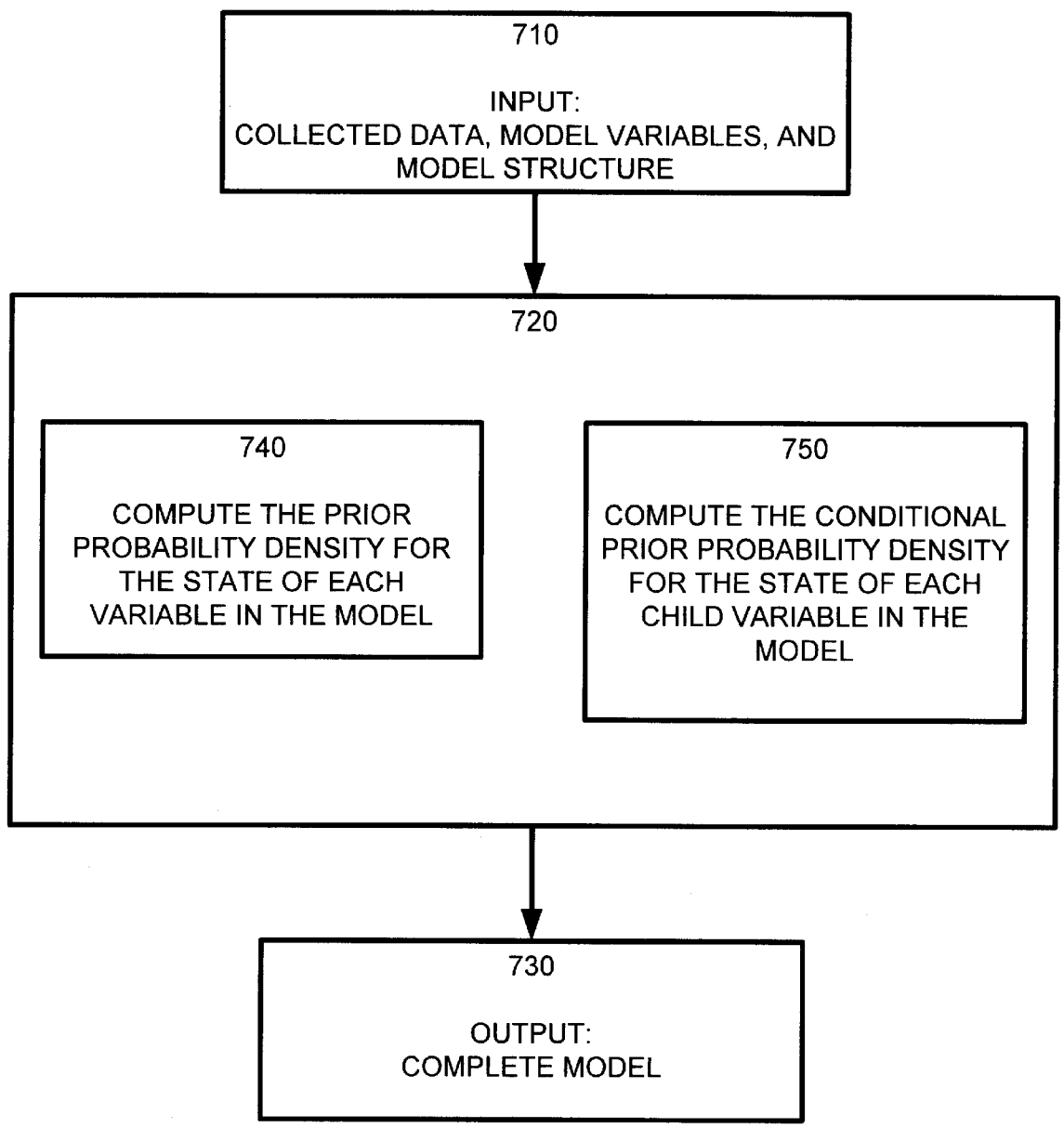
FIG. 7 is a block/flow diagram illustrating the system and method of learning model parameters of FIG. 4.

As illustrated in FIG. 7, the model parameter processor 460 of FIG. 4. "learns" the model parameters from an input 710 preferably consisting of a combination of sensor position data, modality position estimates, model variables and the model structure. In general, FIG. 7 is a block/flow diagram that illustrates the manner in which the input 710 is processed 720 to output a complete model 730.

Specifically, for each variable in the model, a prior probability density is computed for the state, or value, of the corresponding variable based on the fractional occurrence of the state of the variable in the collected data 740. In addition, for each child variable in the model that depends on one or more parent variables, the conditional probability density is computed for the state of each child variable based on the fractional joint occurrence of the state of the child variable with respect to parent states where parent states are defined by taking all combinations of the states of parents for multiple parents of the parent variables in the collected data 750. Further details on probability density is provided in the following references discussed above: U.S. Pat. No. 5,704,018 entitled GENERATING IMPROVED BELIEF NETWORKS and the reference by Heckerman et al entitled "Learning Bayesian networks: The combination of knowledge and statistical data." The order in which the probability density of variables and child variables is computed does not affect the result. Using the computed probability densities in association with each of the variables in the model, a complete model 730 is output for use in tracking objects as described below.

For example, the model parameter processor 460 of FIG. 4. "learns" the model parameters for each variable X in the model from an input 710 by computing prior probability densities, $P(X=x)$, where x denotes the state or value of each variable X in the model, based on the fractional occurrence of x in the collected data. In addition, for each child variable, X, that depends on parent variables in the model, $\{Y_1, \ldots Y_n\}$, the conditional probability densities, $P(X=x|Y_1=y_1, \ldots, Y_n=y_n)$ are computed for each $\{x, y_1, \ldots, y_n\}$, based on fractional joint occurrence of $\{x, y_1, \ldots, y_n\}$ in the collected data. Associating these computed prior and conditional probability densities with the model variables, a complete model is output for use (Box 730 of FIG. 7) is output for use in tracking objects as described below.

Alternatively, other embodiments using techniques for estimating or for filling in missing data in the probability tables, such as, for example, by using Gibbs sampling, may also be used.

Bayesian Network Operation

Figure 8:
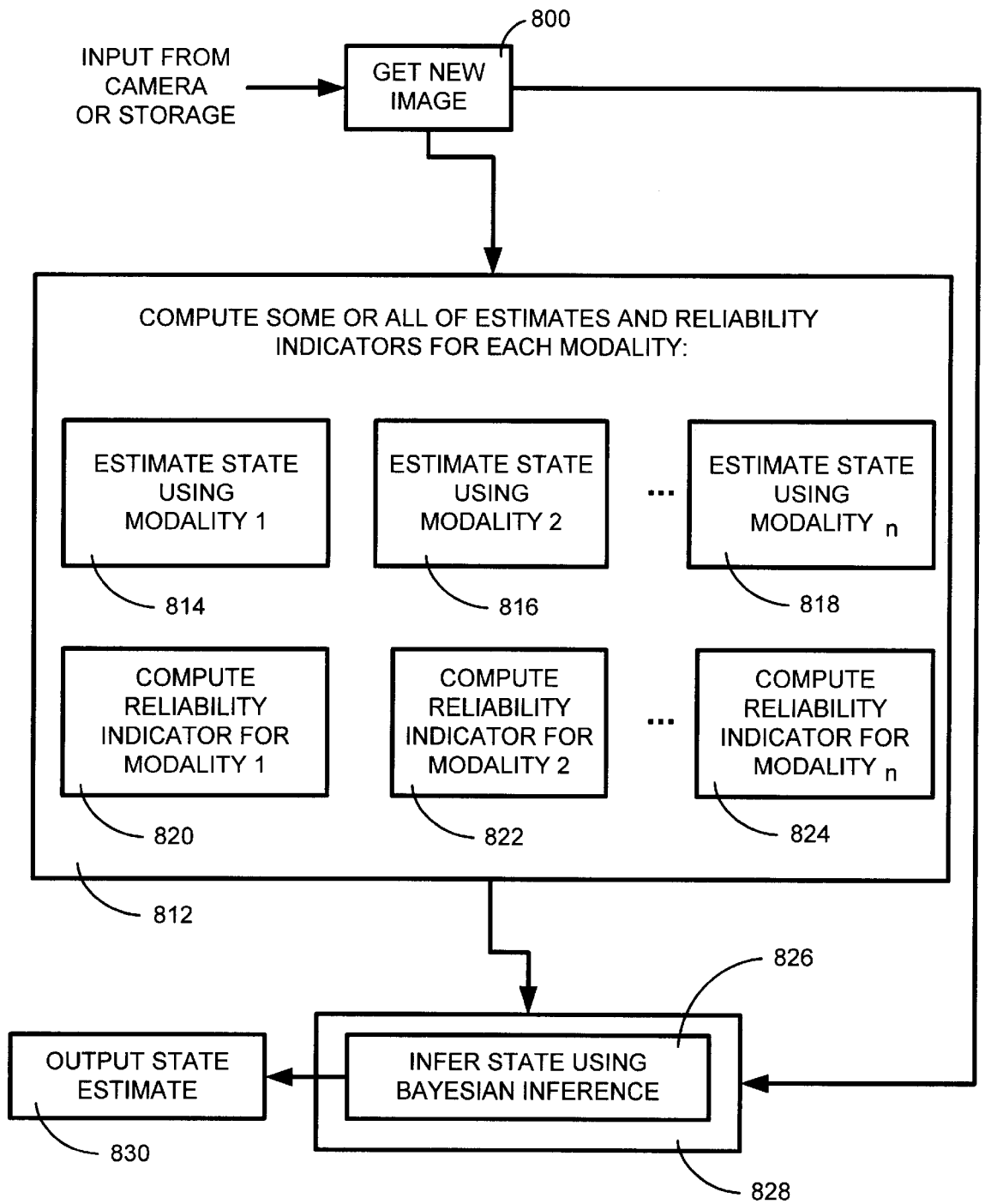
FIG. 8 is a flow diagram illustrating the general operation of the present invention.

FIG. 8 is a block/flow diagram illustrating the general operation of a Bayesian network model structured and trained in accordance with the present invention. In general, for video scenes and image applications, new digital image data relating to a target object is first received by the system 800 from, for instance, a live camera or storage (process 810). A modality processor 812 comprised of multiple vision sensing modalities receives the new digital image data. The modality processor 812 computes some or all of estimates and reliability indicators for each modality. Specifically, the modality processor 812 can estimate states using modalities 1, 2 . . . n (processes 814–818) and compute reliability indicators for modalities 1, 2 . . . n (processes 820–824). Next, a sensor fusion analysis processor receives 826 the estimate and reliability indicator computations and infers states using Bayesian inference (process 828). Last, a state estimate is produced that is a synthesized assessment of the computations (process 830.

Referring to FIG. 3 along with FIG. 8, during operation, the models for Bayesian modality fusion are instantiated with reports 322–328 and reliability indicators 338–352, as shown in FIG. 3. The reliability 330–336 of each modality is computed by the processor 812 and the reports 322–328 from the modalities are integrated to provide a probability distribution over the ground-truth state of the target object.

Working Example

The following description is for illustrative purposes only and describes Bayesian fusion in accordance with the present invention as applied to human head tracking. It should be noted that although the following description involves three modalities, any number of modalities could be used. Also, for simplicity and to illustrate the effectiveness of the Bayesian fusion systems and methods of the present invention, computationally inexpensive modality components are used. In addition, any suitable component can be used, and more sophisticated, complex versions of the sample components can be used.

Figure 9:
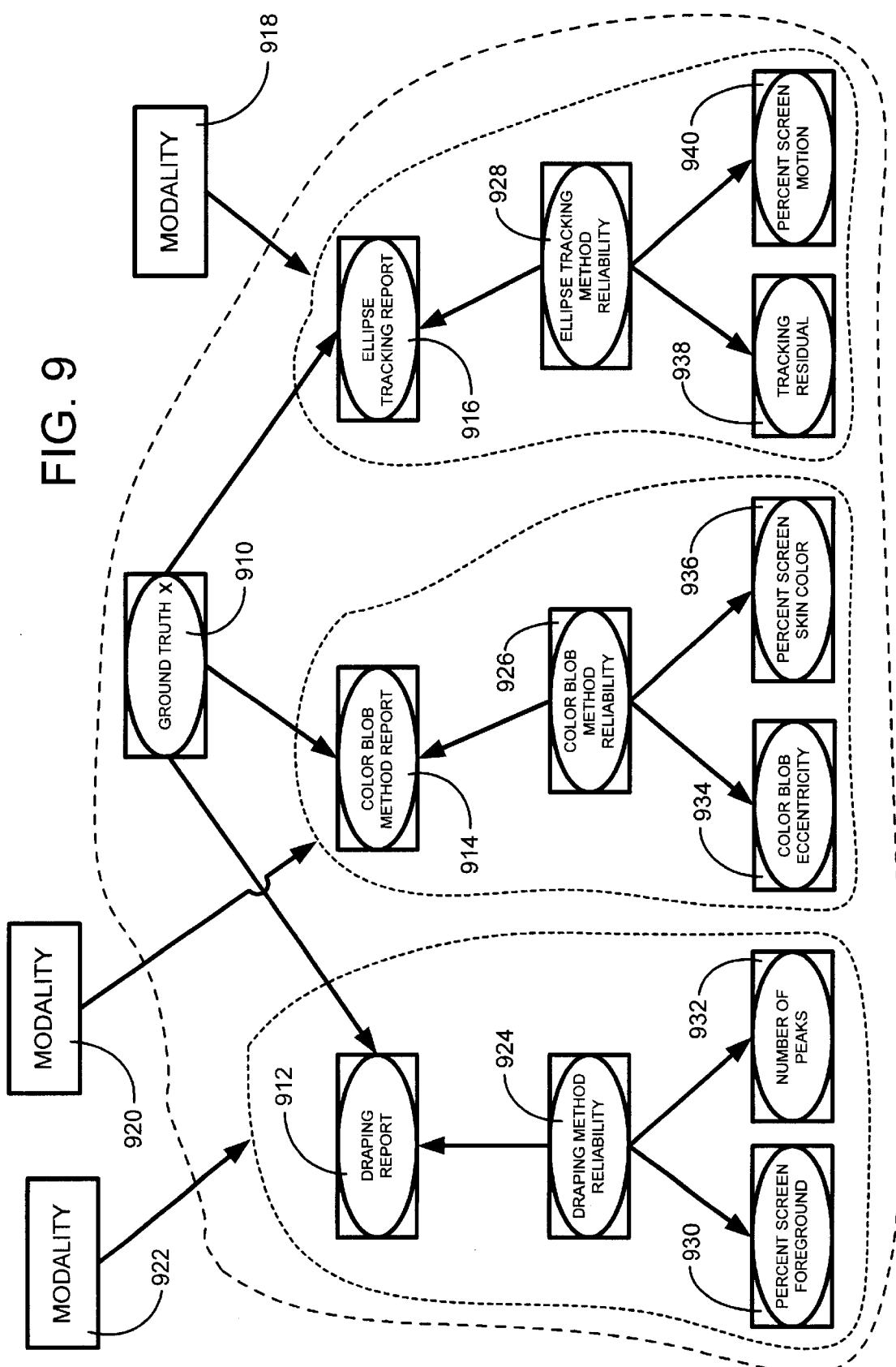
FIG. 9 is a block diagram showing the detailed structure of the Bayesian networks used in a working example of the present invention.

FIG. 9 is a block diagram showing the detailed structure of the Bayesian networks used in a working example of the present invention. FIG. 9 illustrates a Bayesian modality fusion system of the present invention for visual sensing modalities. In this example, a real-time head tracking task is shown with color, motion, and background subtraction modalities fused into a single estimate of head position in an image. Namely, the system 900 robustly tracks a target object, similar to object 208 of FIG. 2, by inferring target data 910 conditioned on report information 912, 914, 916 produced by multiple sensing modalities 918, 920, 922, respectively, tracking the target object.

In general, the network 900 includes one ground truth state 910 and including a consideration of information from multiple modalities 918–922. Each modality 918–922 produces a modality report node 912–916 respectively that represents the reports of the target object or objects location(s), influenced by corresponding modality reliability nodes 924, 926, 928 as well as the variable representing the ground truth. Evidence represented by respective modality reliability indicator nodes 930 and 932, 934 and 936, 938 and 940 are in turn influenced by respective modality reliability nodes 924–928.

The system 900 is preferably a vision-based tracking system for tracking objects of a digitized video scene, such as a sequence of digital images. The target data 910 can be true state information about the target object of the image sequence. Different types of data present in the image sequence, such as edge, color and motion, are used to form a background subtraction visual modality 918, a color-based tracking visual modality 922 and a motion-based tracking visual modality 922.

In particular, the three modalities are (1) peak finding based on background subtraction, (2) color-based "blob" tracking, and (3) motion-based ellipse tracking. The three different visual modalities are implemented with reliability indicators for each modality. Each of these modes reports four values for a surrounding or bounding box of a human head (in image pixels) and two reliability indicators whose output types vary. For all three modalities, computation can take place on low resolution, sub-sampled images (for example, 1 pixel out of every 8×8 from the whole frame).

The Bayesian network 900 captures the probabilistic dependencies between the true state of the object being tracked and evidence obtained from the multiple tracking sensing modalities 918–922. The nodes 910 and 912–940 of the Bayesian network 900 represent variables of interest or random variables and the arcs or line connectors that connect the nodes within system 900 represent probabilistic dependencies among pairs of variables. The Bayesian network:900 facilitates making assertions about and performing inference with the probabilistic influences among variables.

Both reliabilities and estimates of reliabilities typically vary with the structure of the video scene or image sequence being analyzed. To build a coherent framework for fusing reports from multiple modalities, reliability is considered as a variable. From this, probabilistic submodels are built to dynamically diagnose reliability as a function of easily ascertainable static or dynamic features of the image. As shown in FIG. 9, such evidence is represented by modality reliability indicator nodes 930–940, which are in turn caused or influenced by the actual modality reliability nodes 924–928.

Specifically, for each sensor modality 918, 920, 922, respective nodes 912 and 930–932; 914 and 934–936; and 916 and 938–940 are variables that are instantiated by the modalities 918–922 and respective nodes 924, 926, 928 represent inferred values. Also, node 910 is the target ground truth node that represents an inferred value or an unknown state of the target object and the goal of system 900 inference. The ground-truth state influences or causes an output from the modalities 918–922 with both deterministic and stochastic components. The modality report nodes 912–916 are also influenced by their respective reliabilities, or their abilities to accurately estimate ground-truth state.

During operation, the Bayesian model 900 is instantiated with the modality reports 912–916 of each modality 918–922 and associated reliability indicators 930–940. It should be noted that the order or frequency that the modalities contribute their respective reports is flexible. The reliability of each modality 918–922 is computed and each modality report 912–916 is used to provide a probability distribution over the ground-truth state 910 of the target object, in accordance with the expressions discussed above. Specifics of each modality are discussed in detail below.

Background Subtraction Modality

Thresholding the difference between a current image and a stored background image immediately identifies foreground pixels if the camera is stationary. To accommodate deviations from this assumption, the stored background is updated in any suitable updating manner, such as the method provided in the reference entitled "Pfinder: Real-time Tracking of the Human Body," by C. R. Wren, A. Asarbayejani, T. Darrell and A. Pentland, and published in Vismod, 1995, which is incorporated herein by reference.

Given a background image, $I_b(\cdot)$, foreground pixels can be determined as follows:

$$I_f(x, t) = \begin{cases} 1, \text{ if } I(x, t) - I_h(x) > k_f^{thresh} \\ 0, \text{ otherwise} \end{cases}$$

A horizontal line of points connected to neighboring points by spring forces is draped onto a resulting image until the points hit significant clusters of foreground pixels, as described in "Visual Interaction with Lifelike Characters" by M. Turk, and published in Automatic Face and Gesture Recognition, 1996, which is incorporated herein by reference. Peaks in the draped line can be identified and the peak with the width and height closest to the previously known dimensions of the head are returned as the output.

Indicators for this modality are the number of salient peaks in the draped line and the percentage of the image classified foreground pixels. As a result, the modality report 912 is a draping report, the modality reliability 924 is a draping method reliability, and the modality reliability indicators 930, 932 are screen foreground percentages and number of peaks, as shown in FIG. 9.

Color-Based Tracking Modality

Color is an easily computed cue that aids in head tracking. Various skin colors under likely illuminations can be simply approximated by a truncated pyramidal region in RGB (Red/Green/Blue) space bounded by upper and lower thresholds on ratios between red (r) and green (g) pixels, red (r) and blue (b) pixels, and pixel intensity as follows:

$$k_{rg}^- < r/g < k_{rg}^+,$$

$$k_{rb}^- < r/b < k_{rb}^+,$$

$$k_{int}^- < \frac{r+g+b}{3} < k_{int}^+.$$

Binary skin-color classification is performed over the entire image. Then, clusters of skin-colored pixels are identified by radiating investigative spokes outward from a skin-colored seed pixel until they hit non-skin-colored pixels, as described in U.S. co-pending patent application Ser. No. 09/175,182_ entitled "A System And Method For Automatically Detecting Pixel Clusters Within An Image," by Toyama, the subject matter which is incorporated herein by reference.

The bounding box of the cluster whose centroid and size are closest to the previous estimate is reported. Reliability indicators for the color-blob estimate are the aspect ratio of the blob bounding box and the fraction of skin-colored pixels in the image. Thus, the modality report 914 is a color blob report, the modality reliability 926 is a color blob method reliability and the modality reliability indicators 934, 936 are color blob eccentricities and screen skin color percentages, as shown in FIG. 9.

Motion-Based Tracking Modality

Motion can also be a good indicator of head location, as people rarely hold their heads completely still. Pixels exhibiting motion can be detected by thresholding the difference between temporally adjacent image frames. All motion-detected pixels are preferably to a constant, km All other pixels experience a linear decay so that the final decayed motion intensity of the pixel at x is defined as follows:

$$I_m(x, t_i) = \begin{cases} k_m, & \text{if } |I(x, t_i) - I(x, t_{i-1})| < k_m^{thresh}, \\ \max(0, I_m(x, t_{i-1}) - 1), & \text{otherwise.} \end{cases}$$

Ellipse tracking is then performed on the motion intensity image by searching for ellipse parameters (only position and scale over a range immediately surrounding the last known parameters; aspect ratio is fixed) that maximize the normalized sum of the motion intensity values lying beneath the ellipse.

Although motion decay has been used for "stateless" action recognition, the present invention uses it for the purposes of tracking, where it has two desirable effects. First, the decay accumulates motion from previous frames, implicitly smoothing the motion image. Second, the decay creates a gradient in the motion image, rising with recency of motion. Thus, the search range can be constrained for ellipse tracking while maintaining robustness in the absence of motion filters (which often fail under unstable motion). As with color-based head tracking, the bounding box of the final ellipse is used as the head position estimate from motion. Reliability indicators are based on percentage of current motion in the image and the residual of motion intensity observed under the final ellipse. As such, the modality report 916 is an ellipse tracking report, the modality reliability 928 is an ellipse tracking method reliability and the modality reliability indicators 938, 940 are tracking residuals and screen motion percentages, as shown in FIG. 9.

Probability Distributions for the Visual Modalities

Figure 10:
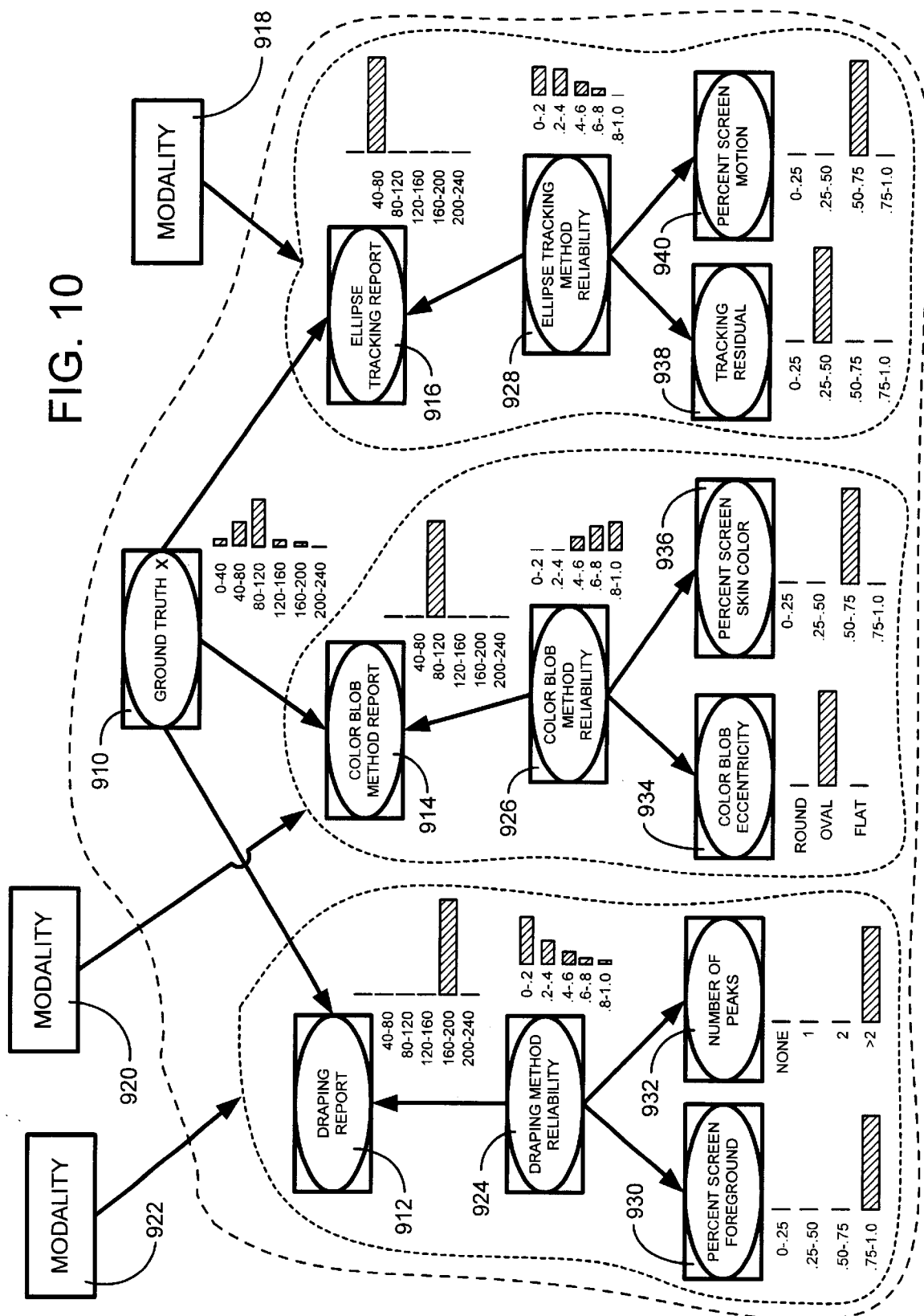
FIGS. 10–11 are block diagrams showing the detailed structure of the Bayesian networks used in the working example of the network of FIG. 10 of the present invention.
Figure 11:
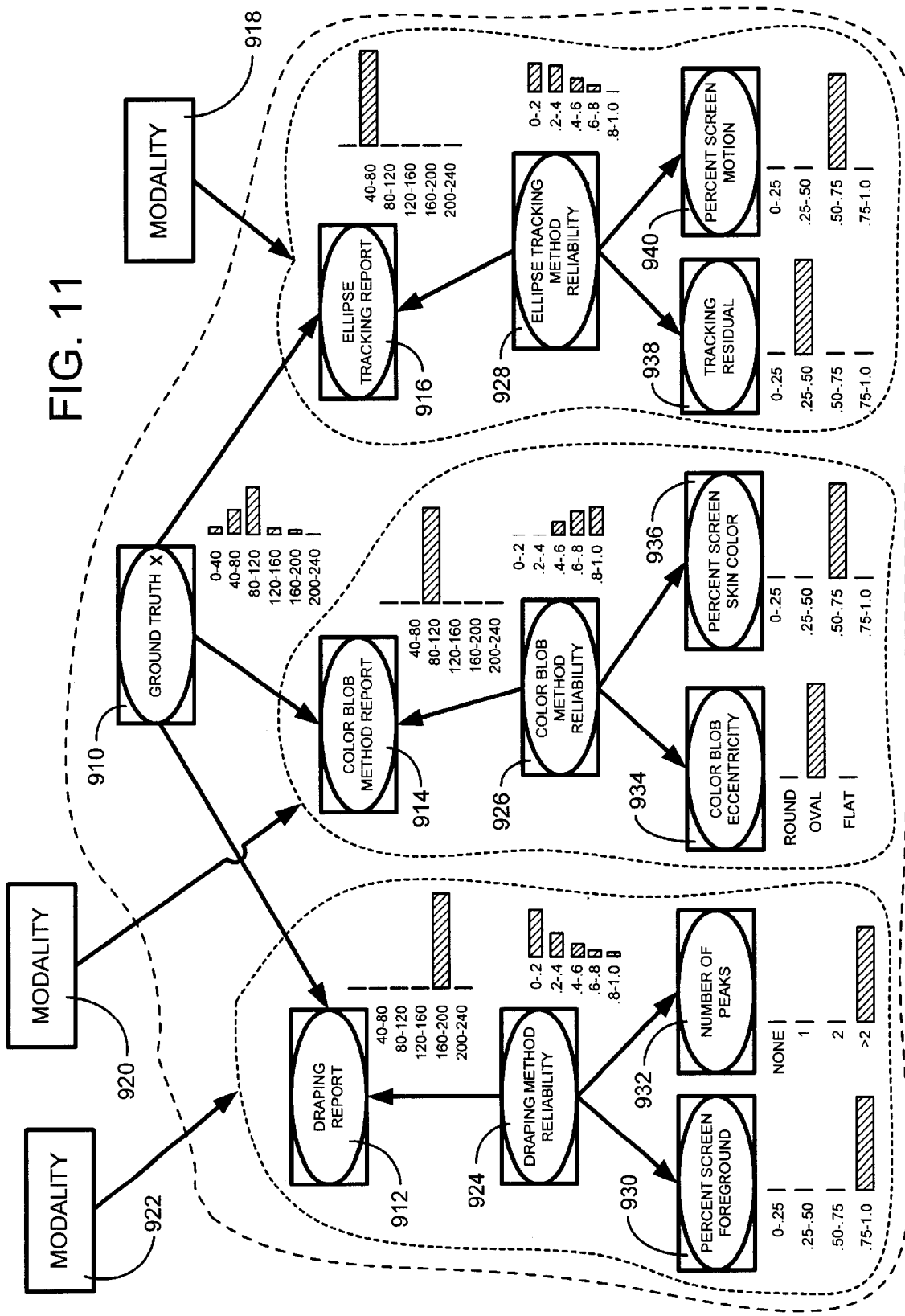

FIGS. 10–11 are block diagrams showing detailed cases of the Bayesian networks used in the working example of the network of FIG. 9 of the present invention. In addition, FIGS. 10–11 illustrate the qualitative performance of the Bayesian modality fusion of the present invention for different cases of the background subtraction, the color-based tracking and the motion-based tracking visual modalities discussed above.

The network 900 of FIG. 9 includes bar graphs adjacent to each node, as shown in FIGS. 10–11. The bar graph adjacent node 910 (node with inferred value) indicates probability distributions of positional coordinates. The bar graphs adjacent nodes 912–916 (nodes with observed values) indicate observed positional coordinates. The bar graphs adjacent nodes 924–928 (nodes with inferred values) indicate probability distributions as ranges of reliabilities for each associated modality. The bar graphs adjacent nodes 930–940 (nodes with observed values) indicate numerical and descriptive measures of associated modalities.

For purposes of illustration only, all variables that are shown in the graphs are coarsely discretized and some results show horizontal position only. For example, the numerical and descriptive measures of the bar graphs adjacent nodes 912–916 and 930–940 discretize the output of each respective modality and the positional coordinates of the bar graphs adjacent nodes 910 and 912–916 show horizontal position only.

In this example, modality reports and ground truth data are in pixels quantized to bins representing 40 pixels each. Reliabilities can be represented with any suitable range of values. In this case, the range is from 0 to 1, where larger values represent greater reliabilities. For the reliability indicators, reliabilities are suitably measured by the respective type of indicator.

During operation, observational variables (nodes 912–916 and nodes 930–940), are set to specific values by the tracking system and inference is performed to compute probability distributions over the states of the hypothesis variables (node 910 and nodes 924–928), including the ground truth and reliabilities. The two cases of the working example (FIG. 10–11) highlight the role of context-sensitive changes in reliabilities of methods. Both cases include the identical (though permuted) set of reports from each of the modalities. However, evidence of reliabilities changes, and as a result, the modality on which the final estimate of head position is most heavily based changes as well. Further, the Bayesian network of the present invention can be trained on real data to assess the probabilities of the effects of indicators on modality reports. Also, reports could be biased based on changing information related to the modalities, such as changing levels of illumination or distinct classes of disruptions or instabilities in a scene (illumination based on time of day, sporadic activity, etc.).

Referring to FIG. 10, the report 914 from the color-blob method (color-based tracking modality 920) dominates the final estimate because the network 900 infers that its reliability is high. Namely, as shown in FIG. 10, the bar graph adjacent node 926 shows a probability distribution that is closer to 1.0 than the other nodes 924 and 928 (larger numbers are associated with higher reliabilities for this variable). In addition, the bar graph adjacent node 914 observes positional coordinates of 80–120, which is closer than the other nodes 912 and 916 to the probability distribution coordinates dominated by 80–120 inferred by ground truth node 910.

The reliability itself was computed by its two child reliability indicator nodes 934, 936 whose values are observed directly (and hence concentrated in single bins). As shown in FIG. 10, reliability indicators 938–940 depress motion-based ellipse reliability and reliability indicators 934–936 raise color-based reliability, resulting in a final estimate that reflects the color-based report more strongly.

In the case of FIG. 11, the report 916 from the ellipse tracking method (motion-based tracking modality 922) dominates the final estimate because the network 900 infers that its reliability is high. Although, the bar graph adjacent node 928 shows a probability distribution that is close to 1.0, but not the closest to 1.0 (the bar graph adjacent node 924 is closest to 1.0), the motion-based tracking modality 922 is considered the dominate modality. This is because, as a whole, the motion-based tracking modality 922, as a visual modality, is considered more reliable than the background subtraction modality 918.

This is evidenced by the bar graph adjacent node 916 which observes positional coordinates of 40–80 which is closer than the other nodes 912 and 914 to the probability distribution coordinates dominated by 40–80 inferred by ground truth node 910. Namely, the bar graph adjacent node 912 observes a coordinate far from the probability distribution coordinates dominated by 40–80 inferred by the ground truth node 910. The reliability itself was computed by its two child reliability indicator nodes 938, 940 whose values are observed directly (and hence concentrated in single bins).

Figure 12A:
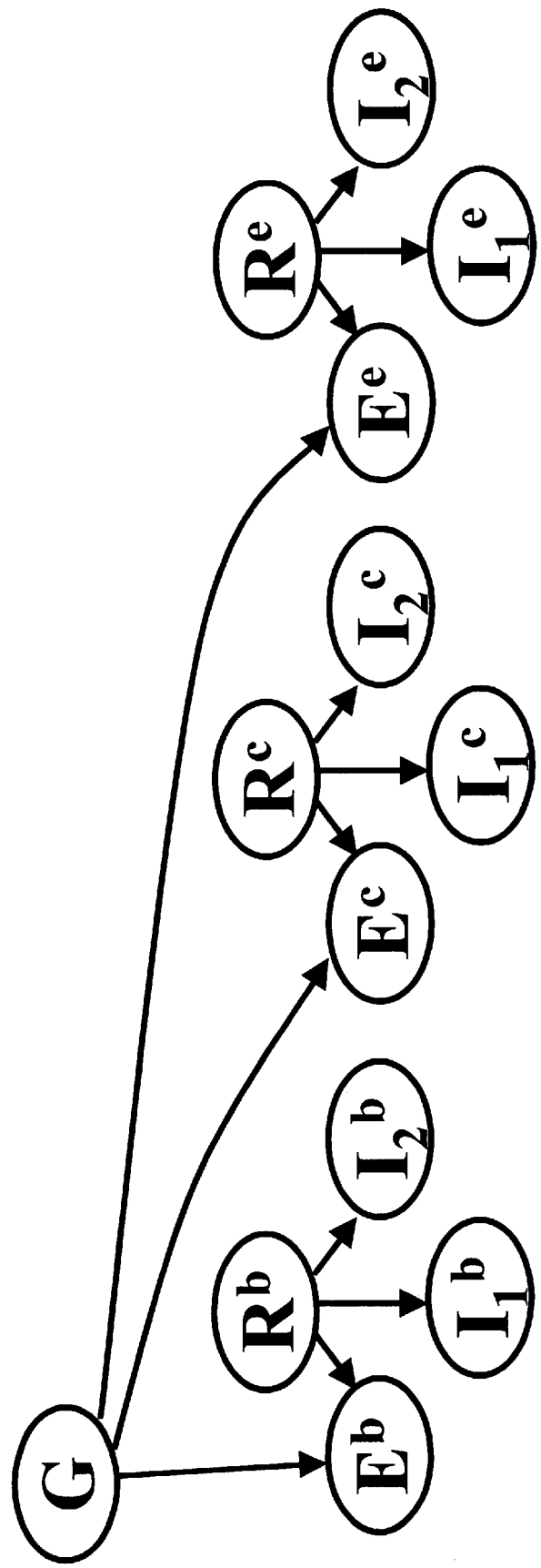
FIG. 12A is an example of a manually structured Bayesian network model.
Figure 12B:
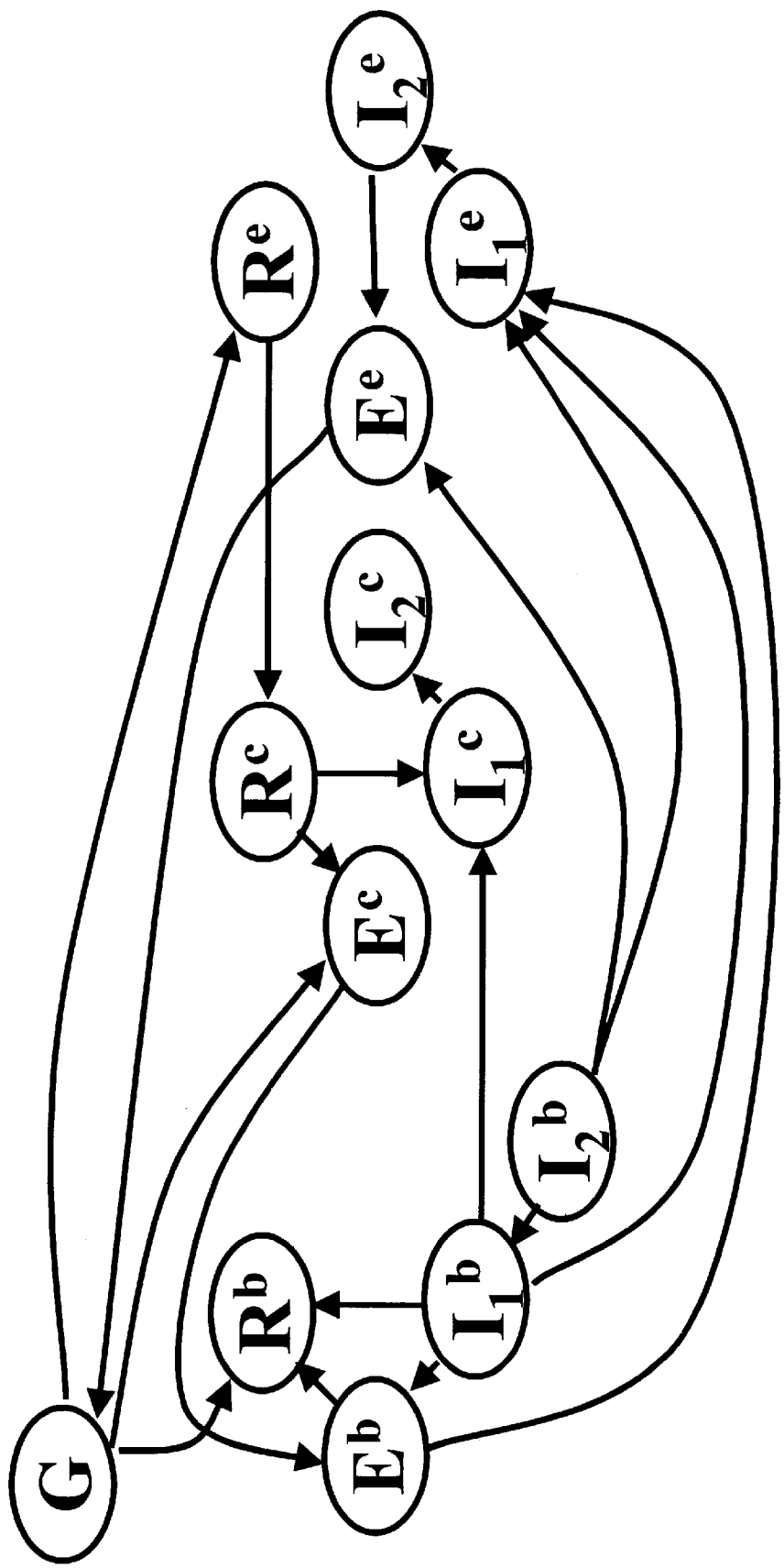
FIG. 12B is an example of a the Bayesian network model of FIG. 12A after training and structuring the model with a set of training data in accordance with the present invention.
Figure 12C:
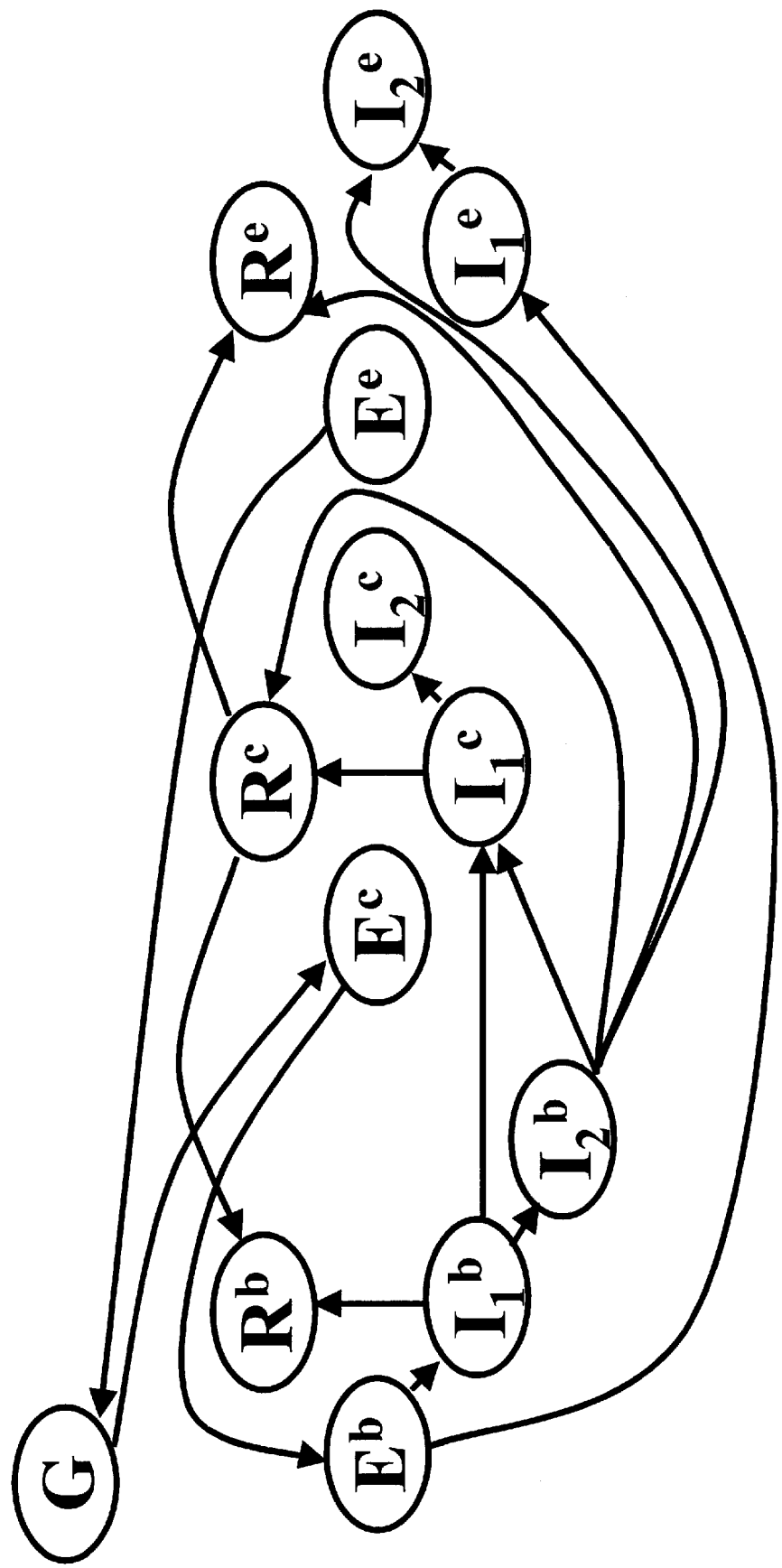
FIG. 12C is an example of a the Bayesian network model of FIG. 12A after training and structuring the model with a set of training data in accordance with the present invention.

FIGS. 12A, 12B, and 12C illustrate three probabilistic models using identical variables yet different variable dependencies. FIG. 12A illustrates a manually designed probabilistic model, while FIGS. 12B and 12C illustrate the same model having new variable dependencies as a result of structuring and training of the model parameters as described above using different sets of training data for the model of FIG. 12B and the model of FIG. 12C. In the nodes in each of the figures, 12A, 12B, and 12C, "G" represents ground truth, "E" represents modality report (or estimate), "R" represents modality reliability, and "I" represents modality reliability indicator. The superscript letters indicate which modality each node is associated with, "b" for background (draping), "c" for color, and "e" for ellipse. Arrows between the nodes illustrate the variable dependencies or links. Note that the automatically produced models of FIGS. 12B 12C. have links that are substantially unlike the manually created links. Some of these links may be non-intuitive, however, they are the links that best explain the data provided to the learning algorithm. Consequently, the resulting model, as shown in FIGS. 12B or 12C should be the best model for tracking objects, if the tracking environment is similar to the one in which the data was taken.

The above described Bayesian modality fusion system and method of the present invention robustly and efficiently tracks visual data by integrating multiple visual tracking algorithms in a probabilistic framework. Tracking of visual data is accomplished by use of a Bayesian network that is trained and structured offline by use of dynamic sensor data for determining object position in conjunction with position estimates provided by each modality. Thus, the trained and structured Bayesian modality fusion of the present invention accomplishes visual tracking by adapting its estimates by detecting changes in indicators of reliability of different algorithms. In other words, the trained and structured Bayesian modality fusion of the present invention provides an expressive framework for weighting and integrating the reports from multiple visual modes. Further, fusion parameters can be learned from data and adjusted automatically, thus eliminating the need to guess the effect of observed variables on inferred variables.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a tracking system having multiple modalities for tracking an object with changing states, a method for training the system comprising:

automatically constructing a set of training cases;

converting the cases into a probabilistic model;

continually inputting a current state of the object being tracked and corresponding values of variables considered in the probabilistic model; and inferring an object position estimate using each modality.

2. The method for training of claim 1 wherein constructing the set of training cases comprises:

providing object ground truth data from at least one sensor;

providing position estimates produced by each modality;

computing reliability indicators for each modality; and computing a ground-truth reliability measurement for each modality.

3. The method of claim 1 wherein a structure of the probabilistic model is automatically inferred from a set of possible models using the current state of the object being tracked and the corresponding values of the variables.

4. The method of claim 1 wherein a structure of the probabilistic model is automatically inferred using the set of training cases.

5. The method of claim 1 wherein a structure of the probabilistic model is computed using object ground truth data, position estimates produced by each modality, reliability indicators for each modality, and ground-truth reliability for each position estimate.

6. The method of claim 3 wherein the structure of the probabilistic model inferred is the model most likely to produce position data approximating the current state of the object being tracked.

7. The method of claim 1 further comprising automatically learning model parameters by using training cases and model variables to compute prior and conditional probability densities of variables considered in a structured probabilistic model.

8. The method of claim 7 wherein the probability densities are used to automatically produce a multi-modality tracking model for accurately approximating the current state of the object being tracked.

9. The method of claim 1 wherein the variables are automatically selected using the current state of the object being tracked and position estimates produced by the multiple modalities.

10. The method of claim 1 wherein fusing the multiple modalities is based on an inferred reliability of position estimates produced by each of the multiple modalities.

11. A system for tracking objects comprising:

a processor receiving state data associated with the objects and processing the data with a plurality of modalities to produce plural position estimates and estimate reliability results indicators;

a training module for training the system with predefined data to assess probabilities of effects of the indicators on the results; and a sensor fusion processor that receives the estimates and reliability results indicators to selectively combine the results and estimates to produce synthesized assessments of the data influenced by the reliability results indicators.

12. The system of claim 11 wherein the training module has an automatically created training data set comprising object ground truth data, position estimates produced by each modality, the reliability results indicators, and ground-truth reliability measurements.

13. The system of claim 11 wherein the training module is capable of automatically inferring a probabilistic dependency structure among variables in a probabilistic network model.

14. The system of claim 11 wherein the training module is capable of automatically learning prior and conditional probabilities for variables in a probabilistic network model.

15. The system of claim 11 wherein the training module is capable of automatically inferring a probabilistic dependency structure among variables in a probabilistic network model, and probability densities characterizing the dependencies.

16. The system of claim 11 wherein the training module is capable of using probabilistic learning methods to infer hidden variables, dependencies, and probability densities of variables in a probabilistic network model.

17. A method for structuring a probabilistic network for tracking moving objects comprising:

constructing a set of training data representing properties of the moving objects;

selecting variables of the network;

automatically inferring the network structure from the training data; and automatically learning parameters of the network variables from the set of training data.

18. The method of claim 17 wherein the network is capable of being trained using the set of training data to assess the probabilistic reliability of one or more vision modalities.

19. The method of claim 17 wherein constructing the set of training data comprises using a sensor to provide object ground truth data which is compared to position estimates generated by one or more vision modalities to compute reliability measurements and reliability indicators.

20. The method of claim 17 wherein probabilistic learning methods are used to automatically infer visible and hidden variables.

21. The method of claim 17 wherein automatically inferring the network structure comprises using the training data to infer a probabilistic dependency structure among variables in the network model by automatically inferring a model which is most probable to accurately track the moving objects.

22. A computer-readable medium having computer-executable modules for structuring and training probabilistic network models for tracking objects, comprising:

a data collection processor that collects data representing properties of the objects;

a variable selection processor that selects variables for the probabilistic network models; and.

a model structure inference processor that infers the structure of the probabilistic network models.

23. The computer-readable medium of claim 22 wherein the data collection processor automatically constructs a set of training data comprising object ground truth positions, position estimates generated by one or more vision modalities, and modality position estimate reliability measurements and indicators.

24. The computer-readable medium of claim 22 wherein the variable selection processor automatically infers visible and hidden variables from a training data set generated by the data collection processor.

25. The computer-readable medium of claim 22 wherein the model structure inference processor automatically infers the network structure which is most probable to accurately track the moving objects using a training data set generated by the data collection processor to infer a probabilistic dependency structure among variables in the network model.

26. The computer-readable medium of claim 22 further comprising a model parameter processor that computes prior and conditional probability densities of variables considered in a structured probabilistic model.

27. The computer-readable medium of claim 22 wherein the network model is dynamically updated as new position data becomes available.

28. A method for training a manually created probabilistic model for tracking an object comprising:

automatically collecting data detailing the current state of the object;

automatically determining a measure of confidence in the manually created model using the data;

automatically learning model parameters from the data;

automatically determining new dependencies among variables considered in the probabilistic model based upon the measure of confidence and the model parameters;

automatically training the probabilistic model using the learned model parameters and the new variable dependencies.

29. The method for training of claim 28 wherein collecting data comprises:

providing object ground truth data from at least one sensor;

providing position estimates produced by at least one modality;

computing reliability indicators for each modality; and computing a ground-truth reliability measurement for each modality.

30. The method of claim 28 wherein training the probabilistic model automatically produces a model which is most likely to accurately approximate a current state of the object being tracked.

31. The method of claim 28 wherein learning model parameters comprises computing prior and conditional probability densities of variables considered in the model.

32. The method of claim 31 wherein the probability densities are used to automatically produce a multi-modality tracking model for accurately approximating a current state of the object being tracked.

33. The method of claim 29 further comprising fusing the at least one modality based on an inferred reliability of position estimates produced by each of the modalities.

* * * * *

UNITED STATES PATENT AND TRADEMARK OFFICE
CERTIFICATE OF CORRECTION

PATENT NO.    : 6,502,082 B1  
DATED         : December 31, 2002  
INVENTOR(S)   : Toyama et al.

It is certified that error appears in the above-identified patent and that said Letters Patent is hereby corrected as shown below:

Title page,
Insert Item [73], to include the following information:
-- Assignee: Microsoft Corporation, Redmond, WA (US) --

Signed and Sealed this

Fifth Day of August, 2003

JAMES E. ROGAN  
*Director of the United States Patent and Trademark Office*